US007134539B2

(12) United States Patent
Kim

(10) Patent No.: US 7,134,539 B2
(45) Date of Patent: Nov. 14, 2006

(54) GUARD DEVICE FOR ESCALATOR HANDRAIL

(75) Inventor: Jong-Sook Kim, Seongnam-si (KR)

(73) Assignee: Chul Soon Im, Kyeonggi-Do (KR)

( * ) Notice: Subject to any disclaimer, the term of this patent is extended or adjusted under 35 U.S.C. 154(b) by 0 days.

(21) Appl. No.: 10/505,217

(22) PCT Filed: Dec. 5, 2003

(86) PCT No.: PCT/KR03/02671

§ 371 (c)(1),
(2), (4) Date: Apr. 21, 2005

(87) PCT Pub. No.: WO2005/018955

PCT Pub. Date: Mar. 3, 2005

(65) Prior Publication Data

US 2005/0217971 A1 Oct. 6, 2005

(30) Foreign Application Priority Data

Aug. 20, 2003 (KR) ...................... 20-2003-0026803
Aug. 20, 2003 (KR) ...................... 20-2003-0026804

(51) Int. Cl.
*B66B 31/00* (2006.01)
*B66B 31/02* (2006.01)
*B66B 29/00* (2006.01)
*B65G 45/00* (2006.01)

(52) U.S. Cl. ...................... 198/338; 198/324; 198/335; 198/337; 198/494; 198/495

(58) Field of Classification Search ................ 198/324, 198/335, 337, 338, 494, 495
See application file for complete search history.

(56) References Cited

U.S. PATENT DOCUMENTS

| | | | | |
|---|---|---|---|---|
| 4,934,512 | A * | 6/1990 | Lin et al. | 198/495 |
| 5,040,659 | A * | 8/1991 | Saito et al. | 198/324 |
| 5,117,968 | A * | 6/1992 | Rivera | 198/496 |
| 6,564,921 | B1 * | 5/2003 | Gorczyca | 198/324 |
| 6,848,805 | B1 * | 2/2005 | Pietz | 362/146 |

FOREIGN PATENT DOCUMENTS

| | | |
|---|---|---|
| DE | 298 11 446 U1 | 11/1998 |
| JP | 08-53281 A | 2/1996 |
| JP | 09-110358 A | 4/1997 |
| KR | 20-0298362 | 12/2002 |

* cited by examiner

*Primary Examiner*—Gene O. Crawford
*Assistant Examiner*—Leslie A. Nicholson, III
(74) *Attorney, Agent, or Firm*—The Webb Law Firm

(57) ABSTRACT

A guard device for a handrail in an entry zone of an escalator is disclosed, which assures safety of an entry of the escalator, sanitary maintenance of the handrail by sterilization, efficient advertisement of products and business corporations, and clean maintenance of air in the entry of the escalator. The guard device includes a guide channel at its bottom to receive a part of the handrail. The guard device further includes a sterilization unit to sterilize the handrail, an advertising display provided on a front face thereof, and an air-cleaning unit provided at a side wall thereof.

20 Claims, 6 Drawing Sheets

Prior Art

Prior Art

GUARD DEVICE FOR ESCALATOR HANDRAIL

TECHNICAL FIELD

The present invention relates to a guard device for a handrail in an entry zone of an escalator, which is intended to assure safety of an entry of the escalator, sanitary maintenance of the handrail by sterilization, efficient advertisement of products and corporations, and clean maintenance of air in the entry of the escalator.

BACKGROUND ART

Generally, escalators are installed on plural stories of buildings in such a way that the escalator are connected to each other in the zigzag fashion, unlike elevators which travels between a riding story and a desired story. Accordingly, the escalators are predominantly used in department stores in which various products are sold, subways, airports, terminals and the like, to which people flock, rather than business buildings. Recently, moving walkways, which are horizontal traveling type of escalators, are used even in the same story, in order to reduce traffic.

Such an escalator is usually designed to travel only in one direction. As shown in FIG. 1, the escalator 10 includes a pair of skirt bases 11, which are spaced from each other with a spacing of about 80 cm–120 cm therebetween, and a step belt consisting of a plurality of steps 12, which travel continuously while maintaining the upper surfaces in the horizontal position and on which passengers mount.

Each of the pair of skirt bases 11 is provided thereon with a lateral balustrade 13 made of glass or metal. The lateral balustrade 13 is provided thereon with a handrail 14, which travels in the same direction and at the same speed as those of the step belt 12, and serves as a handgrip for passengers.

The handrails 14, which serve as handgrip, are intended to prevent passengers from falling down or slipping. To prevent slippage by the passengers, the handrails 14 are commonly made of a rubber material.

Since the handrails 14 come into contact with hands of a multitude of people, if sanitary maintenance of the handrails 14 is not assured, various viruses, bacteria and the like harmful to humans are apt to propagate on the handrails 14. Therefore, the handrails 14 must be always maintained in the clean condition. Up to now, sanitary maintenance of the handrails 14 has been fulfilled by frequently mopping and cleaning surfaces of the handrails 14 with neutral detergent or antiseptic solution.

However, since the conventional handrails of escalators must be frequently cleaned manually, there is a problem in that the maintenance of the handrail requires very high costs. In addition, since the cleaning work cannot positively sterilize and disinfect the handrails by a simple wiping operation, the passengers are exposed to hazard such as disease and bacterial infection due to viruses and bacteria existing on the handrails.

Since escalators are used to transport a multitude of people, it is possible to maximize the advertising effectiveness for products and corporations by providing advertising copies to the escalators. However, heretofore, there are only triangular guide plates positioned at intersections of crossed escalators to prevent passengers' heads from being caught in the intersections, and small advertising boards erected at transferring area between successive escalators, as the advertising copies.

By way of an example, Korean Utility Model Registration No. 20-0298362 discloses an advertising object "P" consisting of a printed layer attached on handrails 14 of an escalator, and a film cover attached to the printed layer, as shown in FIG. 2. However, since the advertising object "P" is attached to the handrails 14 rotating around balustrades of the escalator, the advertising object "P" comes into contact with a multitude of passengers' hands, leading to maculae and contaminant on the advertising object and color fading of the advertising object. For this reason, it is difficult to attract people's attention for the advertising object.

When getting on the escalator 10, a passenger first grips handrails 14 in the entry zone of the escalator and then treads on a step 12. At this point, because the elderly aged or weaker man or children have slow reflexes, his/her arms are pulled forward by the handrails 14 before treading on the steps 12, thereby causing the passenger to be fall down or to be injured.

In addition of the above problems, since the escalators are used by a multitude of people, dust and various bacteria exist in the entry zone of the escalator, reading to unsanitary equipment. However, although the fact that the entry zone of the escalator is unsanitary has been recognized, a specific solution to overcome the problem cannot be achieved.

DISCLOSURE OF THE INVENTION

Accordingly, the present invention has been made keeping in mind the above problems occurring in the prior art, and an object of the present invention is to provide a guard device for an escalator handrail, which receives a part of the handrail in the entry zone of the escalator, to prevent safety hazards which may occur in the entry zone.

Another object of the present invention is to provide a guard device for an escalator handrail, which includes a sterilization unit therein to sterilize the handrail, thereby preventing passengers from being infected by bacteria, viruses and germs existing on the handrail.

A further object of the present invention is to provide a guard device for an escalator handrail, which includes an advertising display provided on an outer surface thereof to provide efficient advertising effects to passengers.

Still another object of the present invention is to provide a guard device for an escalator handrail, which includes an air-cleaning unit provided at a side wall thereof to maintain air in the entry zone in the clean condition.

In order to accomplish the above object, the present invention provides a guard device which is removably mounted on a handrail positioned in an entry zone of an escalator. The guard device includes a guide channel formed at its bottom to receive the portion of the handrail positioned in the entry zone, a sterilization unit to sterilize the handrail, and an advertising display provided on an outer surface thereof to provide efficient advertising effects to passengers.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
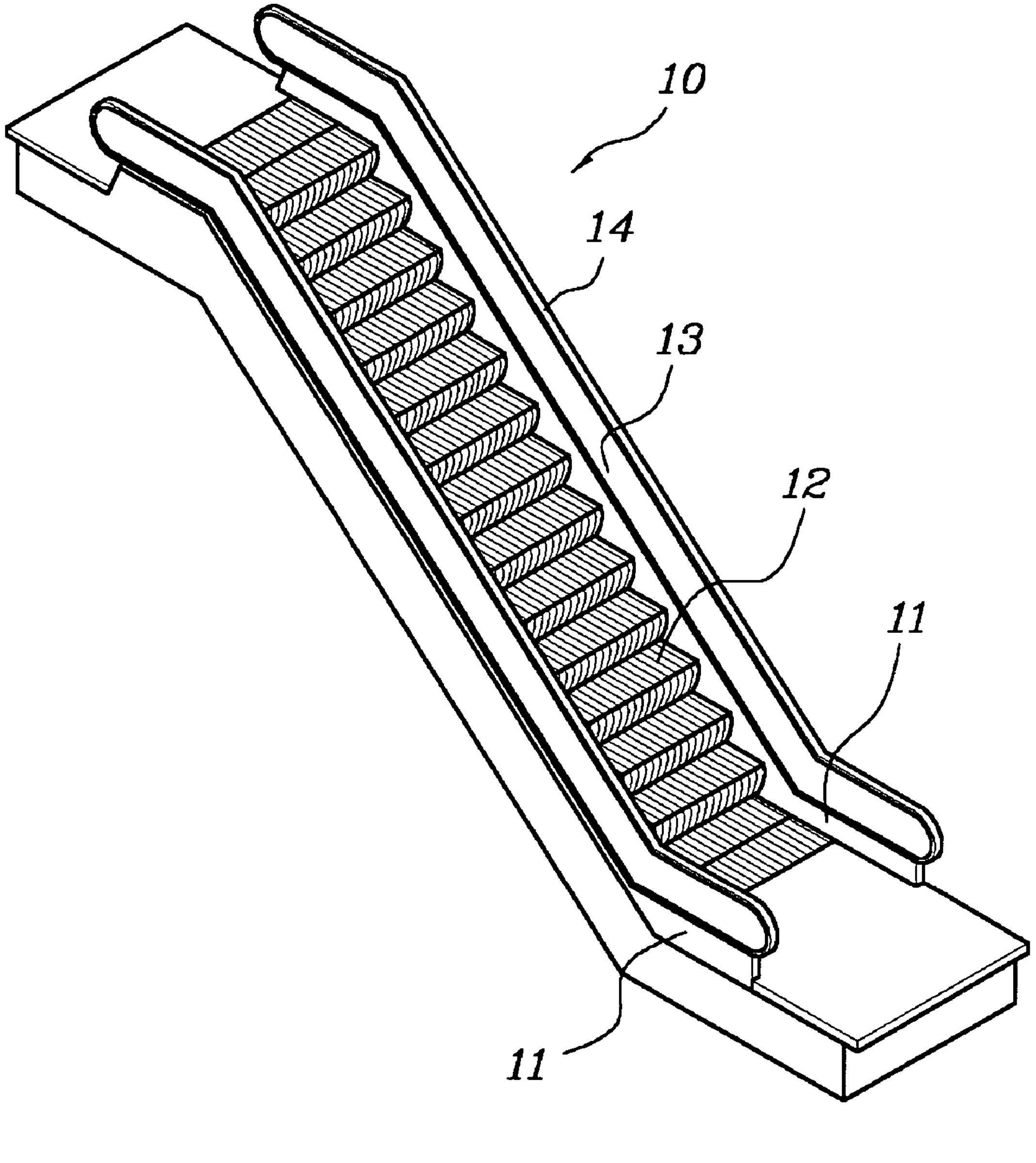
FIG. 1 is a perspective view of a conventional escalator.
Figure 2:
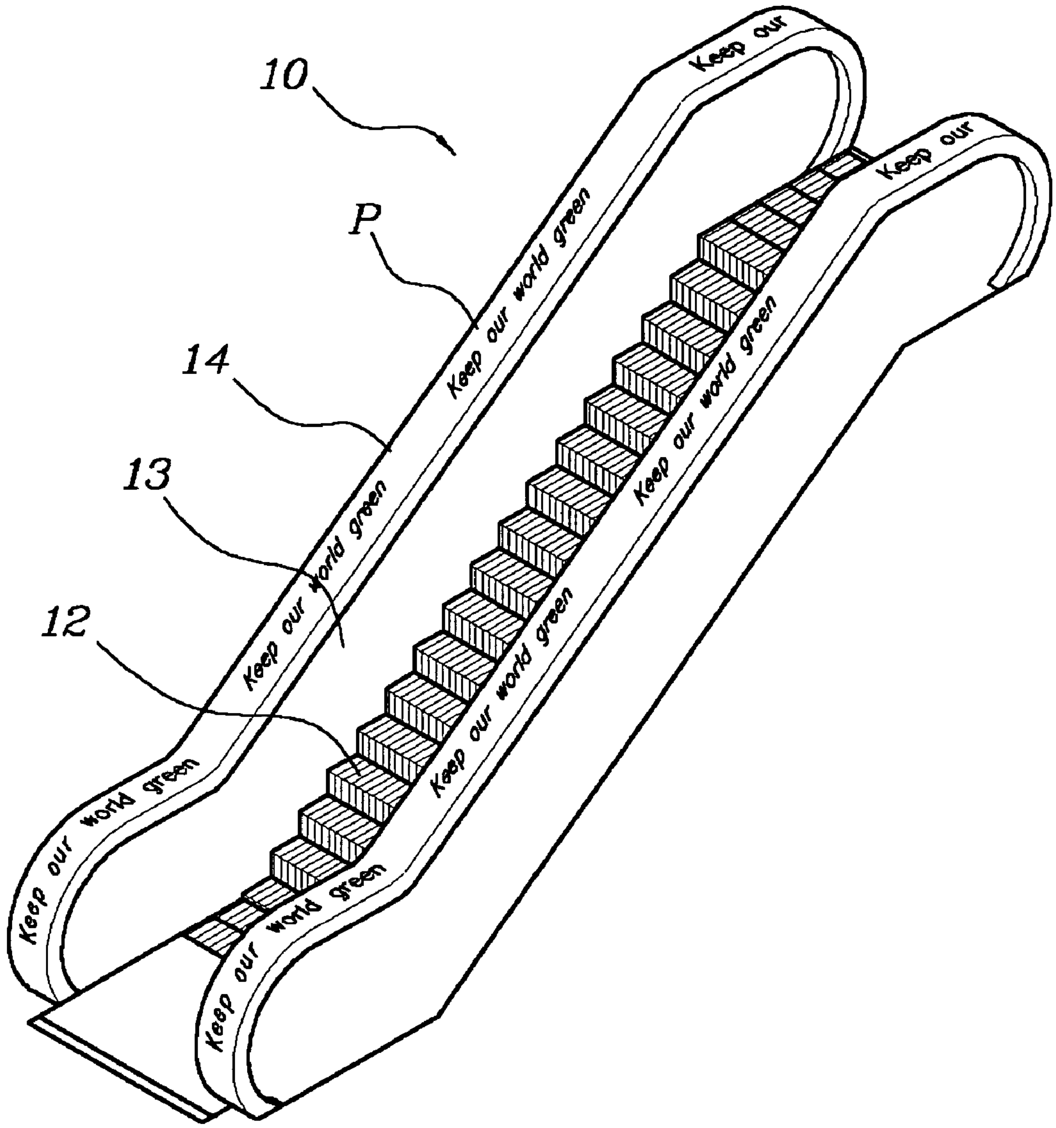
FIG. 2 is a perspective view of a conventional escalator, which is provided at its handrail with advertising slogans.

Reference should now be made to the drawings, in which the same reference numerals are used throughout the different drawings to designate the same or similar components.

Figure 3:
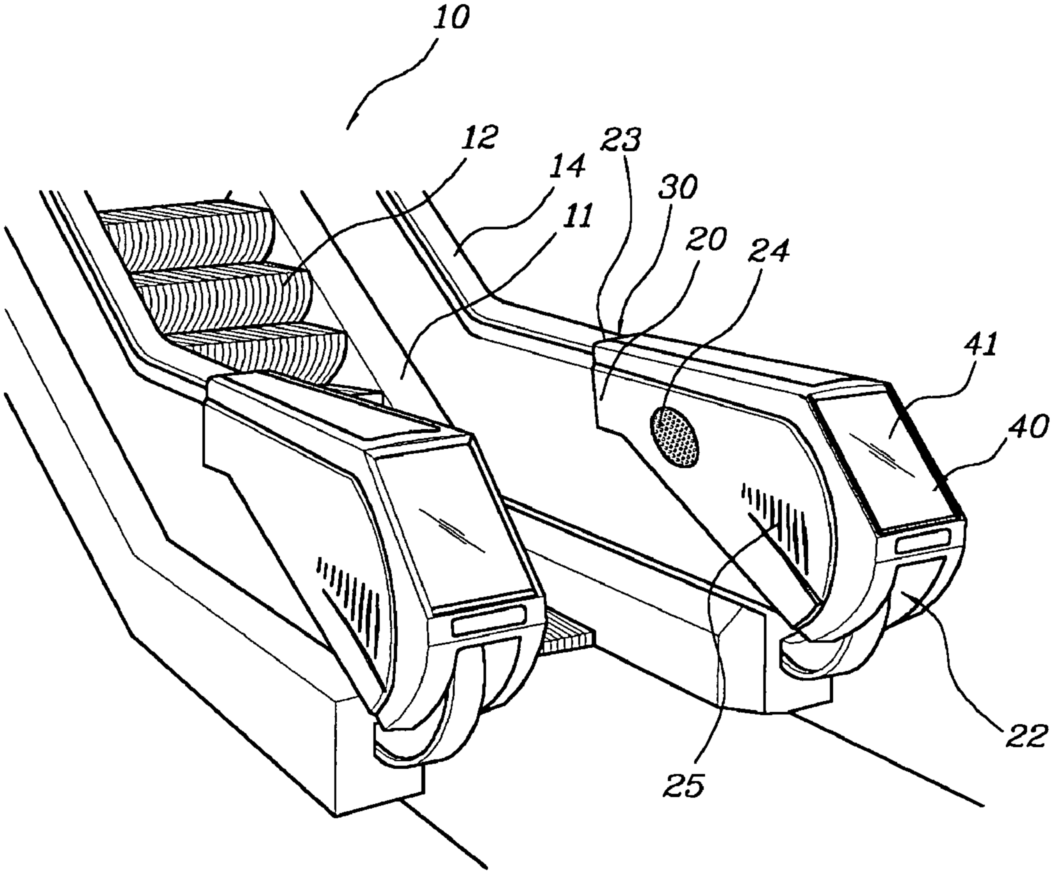
FIG. 3 is a perspective view of guard devices according to an embodiment of the present invention, which are mounted on handrails of an escalator, positioned in an entry zone.
Figure 4:
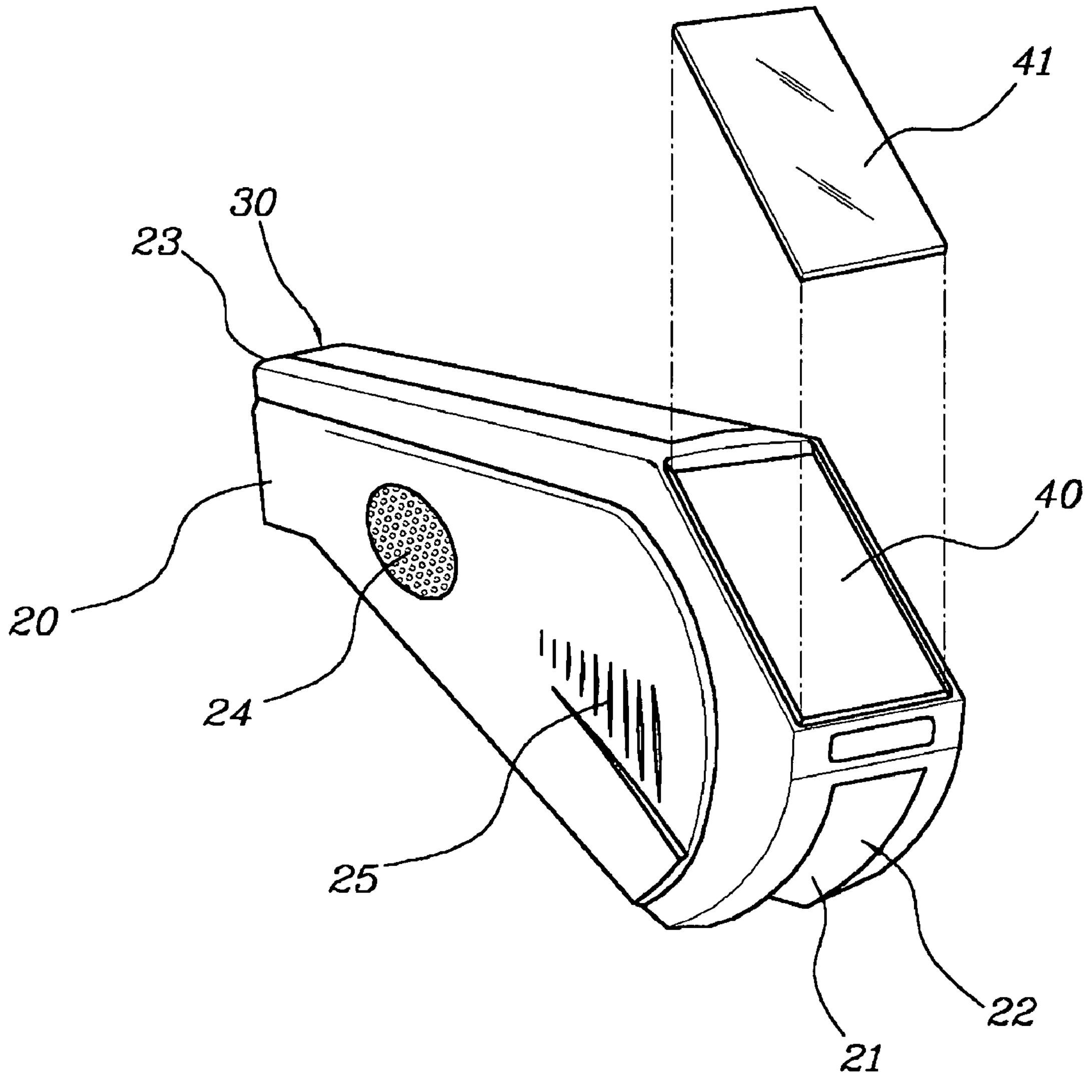
FIG. 4 is an enlarged perspective view of the guard device according to the present invention, in which a transparent sheet is removed therefrom.

FIG. 3 is a perspective view showing guard devices for an escalator, according to an embodiment of the present invention, which are mounted on handrails in an entry zone of the escalator, and FIG. 4 is a perspective view showing only one of the guard devices in detail. As shown in FIGS. 3 and 4, the guard device 20 according to the present invention includes a guide channel 21 with a predetermined depth, which is provided along the center line of an bottom surface of the guard device 20 and in which a handrail 14 is received. The guide channel 21 is formed to avoid interference with the guard device 20 during an operation of the handrail, thus assuring safe and smooth operation of the handrail.

As such, since the guard device 20 is installed on the handrail 14, a portion of the handrail 14 in the entry zone of the escalator, is not exposed to an external environment and thus protected against the environment, thereby overcoming the above-mentioned prior art problem. More specifically, a safety hazard, in which passenger's arms gripping the handrails 14 are pulled forward before treading on the step 12, thereby causing the passenger to fall down or to be injured, is efficiently prevented.

The guard device 20, which is constructed to prevent the safety hazard which may occur in the entry zone of the escalator, has a predetermined length corresponding to a distance between a front end of the handrail 14 and a front edge of the foremost step 12 of the escalator. Therefore, the guard device 20 can prevent a passenger from gripping the handrail 14 in advance of treading on the step 12, thus avoiding safety hazards caused by pulling passenger's arms forward.

Figure 5A:
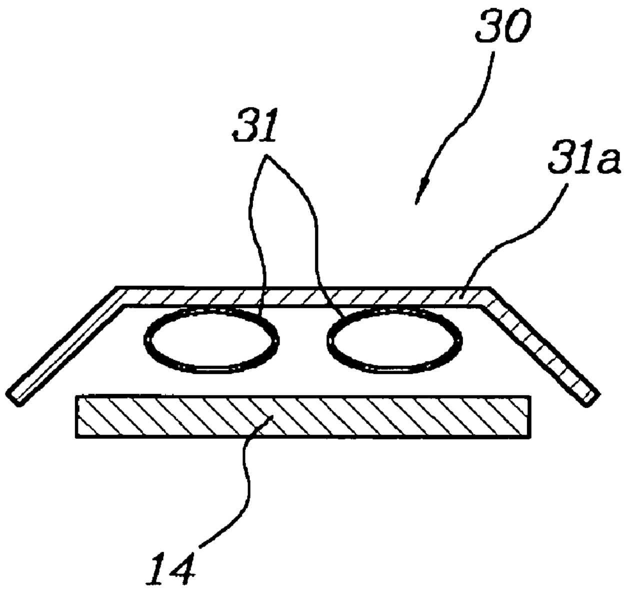
FIG. 5*a* is a cross-sectional view of an example of a sterilization unit provided in the guard device according to the present invention, which includes ultraviolet lamps.

As shown in FIG. 5*a*, the guard device 20 is provided therein with a sterilization unit 30 to sterilize the handrail 14. The sterilization unit 30 is preferably installed at an entrance side 22 or an exit side 23 in the guide channel 21, and is spaced from the handrail 14 by a certain distance while facing the handrail 14.

Figure 5B:
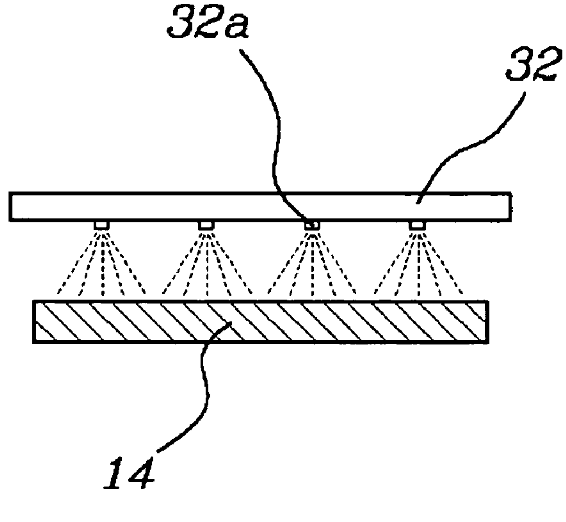
FIG. 5*b* is a cross-sectional view of another example of a sterilization unit provided in the guard device according to the present invention, which includes a sprayer.
Figure 5C:
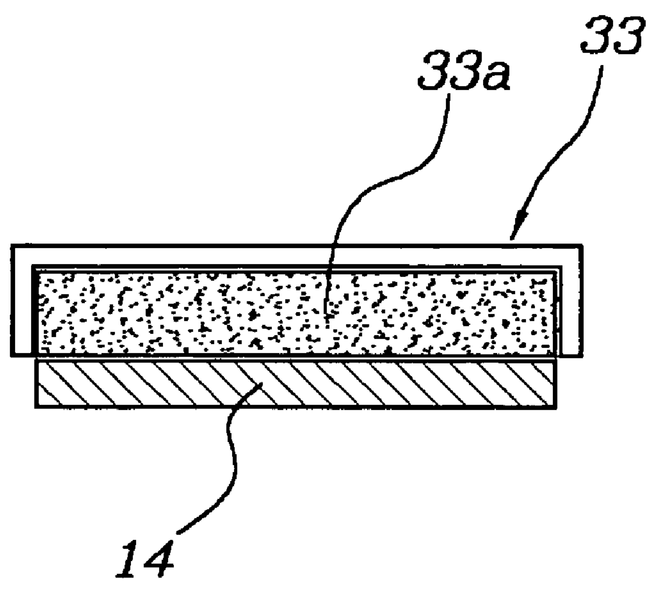
FIG. 5*c* is a cross-sectional view of a further example of a sterilization unit provided in the guard device according to the present invention, which includes an applicator.

Although the sterilization unit 30 is preferably embodied by ultraviolet lamps 31, as shown in FIG. 5*a*, the sterilization unit 30 may be embodied by a sprayer 32 to spray bactericidal liquid on the handrail 14, as shown in FIG. 5*b*, or an applicator 33 to apply bactericidal liquid to the handrail 14, as shown in FIG. 5*c*, if necessary.

The ultraviolet lamps 31 are effective in eliminating most bacteria, viruses and funguses but do not change properties of irradiated objects. Furthermore, since the sterilization unit 30 using the ultraviolet lamps 31 can be operated by a simple manipulation of turning on the ultraviolet lamps 31, its usage is relatively easy, and costs of installation and maintenance are reduced.

In the sterilization unit 30 using the ultraviolet lamps 31, the sterilization unit 30 is preferably provided with a reflecting plate 31*a* to irradiate ultraviolet light to side surfaces as well as an upper surface of the handrail 14. The reflecting plate 31*a* is preferably made of a stainless plate or a metal plate which is effective in reflecting lights.

As shown in FIG. 5*b*, the sprayer 32 includes nozzles 32*a* through which bactericidal liquid is applied to the handrail 14. At this point, the bactericidal liquid is atomized through the nozzles 32*a*, and the atomized bactericidal liquid is applied to the handrail 14. Therefore, even though a passenger grips the handrail 14 immediately after application of the bactericidal liquid, the passenger's hands are not stained with an excessive amount of the bactericidal liquid.

As shown in FIG. 5*c*, the applicator 33 includes a roller 33*a* which is in contact with the handrail 14 to apply bactericidal liquid to the handrail 14. The roller 33*a* is supplied with the bactericidal liquid. As the handrail 14 is operated, the roller 33*a* containing the bactericidal liquid is correspondingly rotated by direct contact with the handrail 14.

The guard device 20 according to the present invention further includes an advertising display 40, which is provided at a front face of the guard device 20 to face upward and forward. The advertising display 40 may be embodied by any one selected from a group consisting of an LED, an LCD, an organic EL sheet and a hologram. Where the advertising display 40 is embodied by the LED, the advertising display 40 includes a plurality of pixels, each being comprised of an LED, and the advertising display 40 is programmed such that the LEDs are selectively blinked to display a desired character or logo.

Meanwhile, where the advertising display 40 is constructed by the LCD or the organic EL sheet, the advertising display 40 can display a moving picture as well as the character and the logo by selectively irradiating a backlight to a plurality of cells constituting a screen of the advertising display 40.

The advertising display 40 according to the present invention enables the advertising contents to be easily substituted with new different contents by changing the program input to the advertising display 40. Alternatively, the advertising display 40 may be provided with the hologram displaying a stereoscopic image or an advertising sticker. The advertising display 40 is covered with a transparent cover 41 to protect the screen of the advertising display 40 against the environment. The transparent cove 41 is made of plastic, synthetic resin, glass or acrylic resin, and removably attached to the screen of the advertising display 40. Accordingly, the advertising display 40 enables the advertising contents to be quickly and easily substituted with new contents according to changes of the advertising provider or production of new brands.

Figure 6:
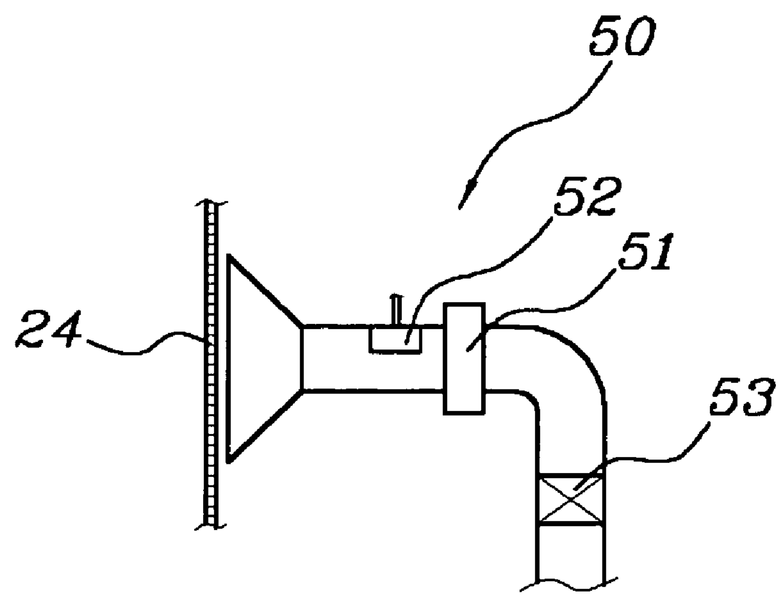
FIG. 6 is a side view of an air-cleaning unit provided in the guard device according to the present invention.

As shown in FIG. 6, the advertising device 20 according to the present invention is further provided at its side wall with an air cleaning unit 50, which functions to draw air in the entry zone of the escalator, remove bacteria and dust from the air, and discharge the cleaned air outside the guard device 50. The air cleaning unit 50 is comprised of a pump 51 to draw outside air and discharge the air outside the guard device 50, an ultraviolet lamp 52 to sterilize the drawn air, and a filter 53 to remove dust from the drawn air.

More specifically, the air cleaning unit 50 fulfills the air-cleaning process in such a way that outside air is drawn into the air cleaning unit 50 through a plurality of through-holes 24 formed at the side wall of the guard device 20 by the pump 51, the drawn air is sterilized by ultraviolet lights emitted from the ultraviolet lamp 52, dust contained in the sterilized air is removed through the filter 53, and the sterilized and filtered air is discharged outside the guard device 20 through a plurality of through-holes 25 formed at the other side wall of the guard device 20. Consequently, the air in the entry zone of the guard device 20 is maintained in a clean condition, thereby having little bad effect on passengers.

Electricity required to drive the sterilization unit 30, the sprayer 32, the applicator 33, the advertising display 40 and the air-cleaning unit 50 may be diverged from the main electric power supplied to the escalator. The above components may be controlled by a control unit (not shown) additionally provided in the guard device 20 or mounted on an outer surface of the guard device 20. The control unit is preferably operated to control the sterilization unit 30, the sprayer 32, the applicator 33, the advertising display 40 and the air-cleaning unit 50 while the escalator is driven.

INDUSTRIAL APPLICABILITY

As described above, the present invention provides a guard device, which is mounted on a handrail positioned in an entry zone of an escalator to prevent safety hazards which may occur in the entry zone.

Since the guard device according to the present invention includes a sterilization unit therein to sterilize the handrail, it is possible to prevent passengers from being infected by bacteria, viruses or germs existing on the handrail.

Furthermore, since the guard device according to the present invention includes an advertising display on an outer surface thereof, it is possible to achieve efficient advertising and informing effects for corporations and products.

In addition, since the guard device according to the present invention includes an air-cleaning unit at a side wall thereof, which is intended to draw outside air in an entry zone of an escalator, eliminate undesired substances such as bacteria, viruses and dust from the drawn air and discharge the cleaned air outside the guard device, it is possible to maintain air in the entry zone of the escalator in the sanitary condition.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A guard device for a front of an escalator handrail, the guard device having a length approximately equal to a distance between a front end of the handrail and a foremost step of the escalator, the guard device comprising:

- a guide channel formed at the bottom of said guard device with a predetermined depth to receive a part of the handrail positioned in an entry zone of the escalator that resides between the front end of the handrail and the foremost step of the escalator;
- a sterilization unit installed in the guard device to sterilize at least part of the handrail of the escalator received in said guide channel;
- an advertising display unit provided on a top of said guard device on a slant to the end part of the handrail in the entry zone of the escalator; and
- a control unit which controls said sterilization unit and said advertising display unit with electric power.

2. The guard device as set forth in claim 1, wherein said guide channel is provided along the center line of the bottom surface of the guard device.

3. The guard device as set forth in claim 1, wherein said sterilization unit is embodied by ultraviolet lamps installed inside of the guard device and spaced from the handrail received therein by a certain distance while facing the handrail.

4. The guard device as set forth in claim 1, wherein said sterilization unit is embodied by a sprayer installed inside of the guard device and spaced from the handrail received therein by a certain distance while facing the handrail.

5. The guard device as set forth in claim 1, wherein said sterilization unit is embodied by an applying means to apply bactericidal liquid to the handrail received therein.

6. The guard device as set forth in claim 3, wherein the sterilization unit comprises a reflecting plate to irradiate ultraviolet light to side surfaces as well as an upper surface of the handrail received therein.

7. The guard device as set forth in claim 5, wherein said applying means includes a roller which is supplied with bactericidal liquid and is in contact with the handrail to apply the bactericidal liquid.

8. The guard device as set forth in claim 1, wherein the display panel of the advertising display unit is embodied by any one selected from a group consisting of an LED, an LCD, an organic EL sheet and hologram.

9. The guard device as set forth in claim 1, wherein the advertising display unit is constituted to be programmed to display desired characters or logos.

10. The guard device as set forth in claim 9, wherein the advertising display unit is constituted to enable the advertising contents to be substituted with different contents by changing the program input to the advertising display unit.

11. The guard device as set forth in claim 1, wherein the display panel of the advertising display unit is covered with a transparent cover embodied by any one selected from a group consisting of plastic, synthetic resin, glass or acrylic resin.

12. The guard device as set forth in claim 1, further comprising an air cleaning unit which functions to draw air in the entry zone of the escalator, remove bacteria and dust from the air, and discharge the air outside the guard device.

13. The guard device as set forth in claim 1, wherein the control unit is provided inside of the guard device.

14. A guard device for a front end of an escalator handrail, the guard device having a length approximately equal to a distance between the front end of the handrail and a foremost step of the escalator, the guard device comprising:

- a guide channel formed at the bottom of said guard device with a predetermined depth to receive a part of the handrail positioned between the front end of the handrail and the forefront step of the escalator;
- a sterilization unit installed in the guard device for sterilizing the handrail as it moves through the guard device;
- an advertising display unit provided on said guard device adjacent the front end of the handrail and on a slant to the front end of the handrail; and
- a control unit which controls said sterilization unit and said advertising display unit with electric power.

15. A guard device as set forth in claim 14, wherein said sterilization unit is embodied by ultraviolet lamps installed inside of the guard device and spaced from the handrail received therein by a certain distance while facing the handrail.

16. A guard device as set forth in claim 14, wherein the advertising display unit is constituted to be programmed to display desired characters or logos.

17. A guard device for a front end of an escalator handrail, the guard device comprising:

an enclosure defining an interior in which a part of a top of the handrail and at least a part of the front end of the handrail are received, said enclosure having along a bottom thereof an opening disposed such that a bottom of the handrail enters the interior of the enclosure via said opening;

a sterilization unit disposed in the enclosure for sterilizing the handrail as it moves through the enclosure;

an advertising display unit disposed in the enclosure adjacent the front end of the handrail and on a slant to the front end of the handrail; and a control unit which controls said sterilization unit and said advertising display unit with electric power.

18. A guard device as set forth in claim 17, wherein said sterilization unit is embodied by ultraviolet lamps installed inside of the guard device and spaced from the handrail received therein by a certain distance while facing the handrail.

19. A guard device as set forth in claim 17, wherein the advertising display unit is constituted to be programmed to display desired characters or logos.

20. A guard device as set forth in claim 19, wherein the advertising display unit is constituted to enable the advertising contents to be substituted with different contents by changing the program input to the advertising display unit.

* * * * *